US012590875B1

(12) United States Patent
Miesner

(10) Patent No.: US 12,590,875 B1
(45) Date of Patent: Mar. 31, 2026

(54) SUBMERSIBLE IMPACT TEST HAMMER

(71) Applicant: United States of America as Represented by the Secretary of the Navy, Arlington, VA (US)

(72) Inventor: John E. Miesner, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 392 days.

(21) Appl. No.: 18/356,391

(22) Filed: Jul. 21, 2023

Related U.S. Application Data

(60) Provisional application No. 63/510,647, filed on Jun. 28, 2023.

(51) Int. Cl.
| | |
|---|---|
| *G01N 3/317* | (2006.01) |
| *G01M 7/08* | (2006.01) |
| *G01N 3/34* | (2006.01) |
| *G01N 3/38* | (2006.01) |

(52) U.S. Cl.
CPC ................. *G01N 3/34* (2013.01); *G01N 3/38* (2013.01)

(58) Field of Classification Search
None
See application file for complete search history.

(56) References Cited

U.S. PATENT DOCUMENTS

2013/0261681 A1* 10/2013 Bittenson ............... A61B 17/92
606/86 R

FOREIGN PATENT DOCUMENTS

| | | | | |
|---|---|---|---|---|
| CN | 103454111 A | * | 12/2013 | |
| KR | 20170004189 A | * | 1/2017 | ............... G01N 3/52 |
| SU | 1116137 A1 | * | 9/1984 | |

* cited by examiner

*Primary Examiner* — Stephen D Meier
*Assistant Examiner* — Ruben C Parco, Jr.
(74) *Attorney, Agent, or Firm* — Jesus J. Hernandez; U.S. Department of the Navy, Office of the General Counsel

(57) ABSTRACT

Example embodiments disclose a submersible impact test hammer comprising a resilient tip, an output shaft, an end closure, a pressure housing, a sealing bearing that supports the output shaft to the end closure, a slug, solenoid coils, slug shaft bolts, linear bearings that slidably mount the slug to the slug shaft bolts, and a spring between the slug and the output shaft. The pressure housing may be attached to the end closure such that the two enclose a watertight volume, and the sealing bearing may allow relative movement while preventing leakage into the watertight volume. The current through the solenoid coils may create an attractive magnetic force between the slug and the end closure accelerating the slug toward the end closure, and the impact of the slug against the output shaft may create a force pulse which is transmitted to the resilient tip and then to a test object.

6 Claims, 6 Drawing Sheets

300

SUBMERSIBLE IMPACT TEST HAMMER

CROSS-REFERENCE TO RELATED APPLICATIONS

This application claims the benefit of U.S. Provisional Application No. 63/510,647 filed Jun. 28, 2023, titled "SUBMERSIBLE IMPACT TEST HAMMER," incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

FIELD

The following description relates generally to underwater structural response testing.

BACKGROUND

Hand-held instrumented impact hammers are commonly used in structural response testing. Repeated blows onto a defined test point with consistent intensity are necessary for best test results. Consistent blows are very difficult to achieve when the test object is submerged, such as an underwater pipeline. This is especially true when the operator does not have an unobstructed hammer swing path or a convenient body position available.

The state of the art does not provide for an instrumented, hand-held, battery-powered, submersible impact test hammer capable of producing repeatable measured force pulses for structural response testing. An impact test hammer should be capable of providing multiple force pulses to a defined location without requiring a swing path. The impact test hammer should provide a long battery life and be easily rechargeable.

SUMMARY

Example embodiments disclose a submersible impact test hammer comprising a resilient tip, an output shaft, an end closure, a pressure housing, a sealing bearing that supports the output shaft to the end closure, a slug, solenoid coils, slug shaft bolts, linear bearings that slidably mount the slug to the slug shaft bolts, and a spring between the slug and the output shaft. The pressure housing may be attached to the end closure such that the two enclose a watertight volume, and the sealing bearing may allow relative movement while preventing leakage into the watertight volume. The current through the solenoid coils may create an attractive magnetic force between the slug and the end closure accelerating the slug toward the end closure, and the impact of the slug against the output shaft may create a force pulse which is transmitted to the resilient tip and then to a test object.

BRIEF DESCRIPTION OF DRAWINGS

The accompanying figures are included to provide a further understanding of example embodiments, and are incorporated in and constitute part of this specification. In the figures.

DESCRIPTION

Figure 1:
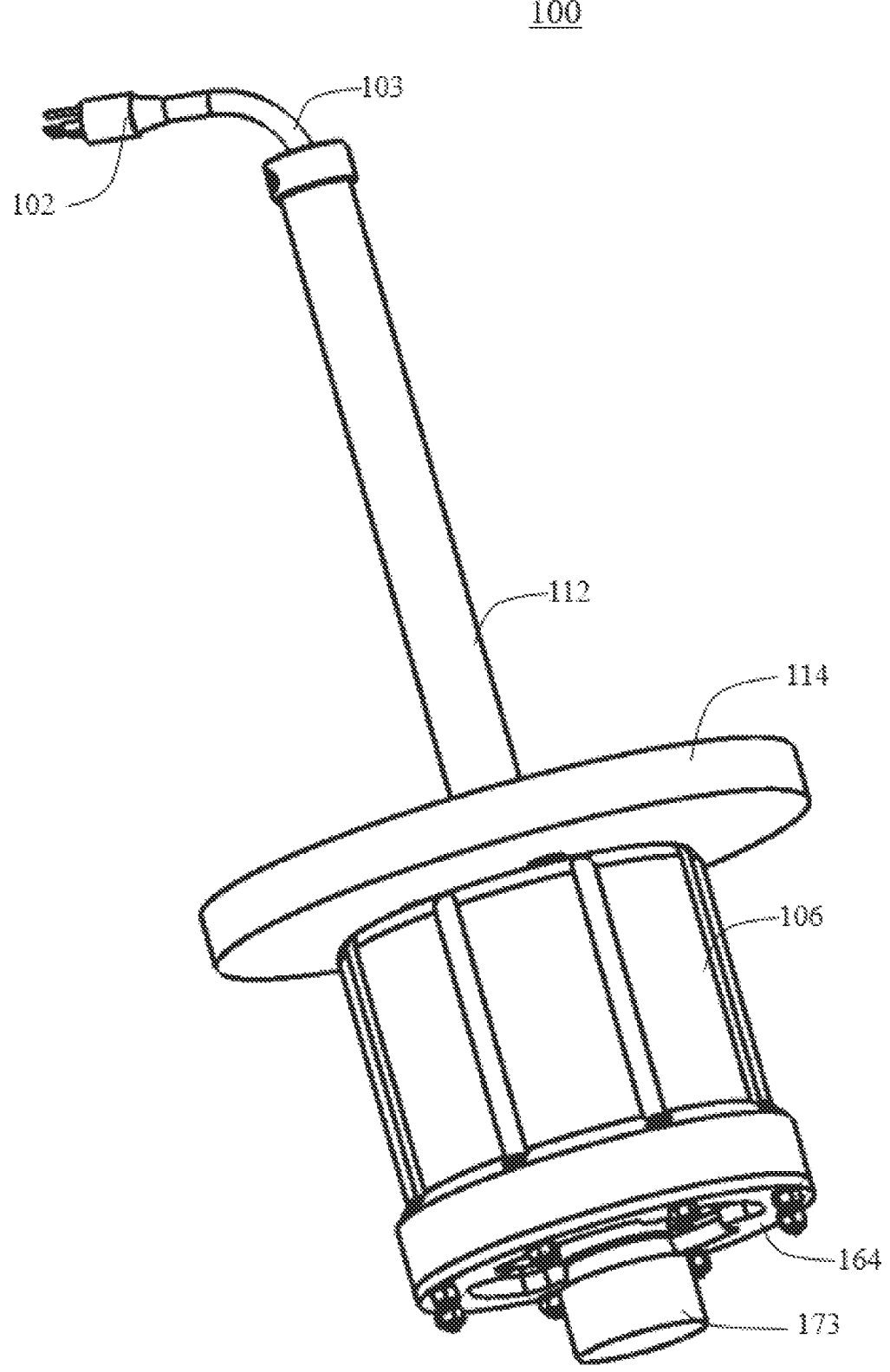
FIG. 1 is an overall view of a submersible impact test hammer according to an example embodiment.

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to a submersible impact test hammer. However, it should be noted that the example embodiments shown and described herein are meant to be illustrative only and not limiting in any way. As such, various modifications will be apparent to those skilled in the art for application to any submersible vessel, surface vessel, and comparable vessels based on technologies other than the above, which may be in various stages of development and intended for future replacement of, or use with, the above described method or apparatus.

The goal of example embodiments is to provide an instrumented, hand-held, battery-powered, submersible impact test hammer capable of producing repeatable measured force pulses for underwater structural response testing. According to example embodiments, when the impact test hammer resilient tip is pressed against an object, solenoid coils may accelerate a slug which impacts an output shaft producing a force pulse into the resilient tip and then into the test object. The test hammer force measurement may be provided by an accelerometer in the output shaft through a cable and cable connector to a data collection system. The cable may also be used to charge the battery as required. A baffle may add virtual mass from entrained fluid to reduce reaction motion and isolate the operator from the impact force. All impact test hammer electrical components may be resiliently mounted to prevent damage from impact shock.

Example embodiments provide an instrumented impact test hammer that is designed to operate submerged. The impact test hammer may include an accelerometer for force measurement and a cable with connector to provide the force measurement to a data collection system. The impact test hammer may remain in contact with the test object for multiple pulses to ensure the multiple forces are applied to a defined test location. The impact test hammer may have internal battery power with the battery being rechargeable through the cable and connector. The impact test hammer does not require a swing path and may be easily maneuvered into position. The impact test hammer may be triggered when the operator presses its resilient tip against the defined test location. This action may compress springs to move a magnet into proximity with a magnetic switch, closing the contacts and triggering a time delay relay. After a defined delay, the time delay relay may trigger a power relay which connects the battery to solenoid coils in a slug, accelerating it into contact with an output shaft, producing a force pulse into the resilient tip and then into the test object. The time delay relay may prevent inadvertent triggering and ensure sufficient time between pulses for structural response to dissipate. The impact test hammer may provide repeated force pulses, corresponding to the set time delay, as long as the resilient tip remains pressed against the test object. A baffle may add virtual mass from entrained fluid to reduce reaction motion and isolate the operator from the impact force.

FIG. 1 is an overall view of the submersible impact test hammer (100) according to an example embodiment. According to example embodiments, an operator may hold and position the impact test hammer (100) using either one or two hands (not shown) on an outer handle (112). When the operator presses impact tip (173) against an object to be tested, a force pulse may be produced through the impact tip (173) into the object to be tested. The impact tip (173) may be pressed against a defined test location on the object. This action may compress springs within the impact test hammer (100) to move a magnet into proximity with a magnetic switch, closing the contacts and triggering a time delay relay. After a defined delay, the time delay relay may trigger a power relay. The power relay may electrically connect the battery to solenoid coils in a slug, accelerating it into contact with an output shaft. This may produce a force pulse into the resilient tip, and then into the object to be tested.

A force measurement signal may be provided through cable (103) and cable connector (102) to an external data collection system. The data collection system is not shown in FIG. 1. The impact test hammer (100) may include an accelerometer in an output shaft to provide the force measurement signal to the external data collection system through cable (103) and cable connector (102). The time delay relay may prevent inadvertent triggering and ensures sufficient time between pulses for structural responses to dissipate. The impact test hammer (100) may provide repeated force pulses, corresponding to the set time delay, as long as the impact tip (173) remains pressed against the test object.

A pressure housing (106) and end closure (164) may enclose a watertight volume keeping internal components dry and allowing the impact test hammer (100) to operate submerged. The impact test hammer (100) may include an internal battery power that is designed to operate submerged.

The impact test hammer (100) may remain in contact with the test object for multiple pulses to ensure it is adequately applied to the required location. The impact test hammer (100) does not require a swing path and may be easily maneuvered into position. A baffle (114) may add virtual mass from entrained fluid to reduce reaction acceleration and isolate the operator from the impact force.

Figure 2:
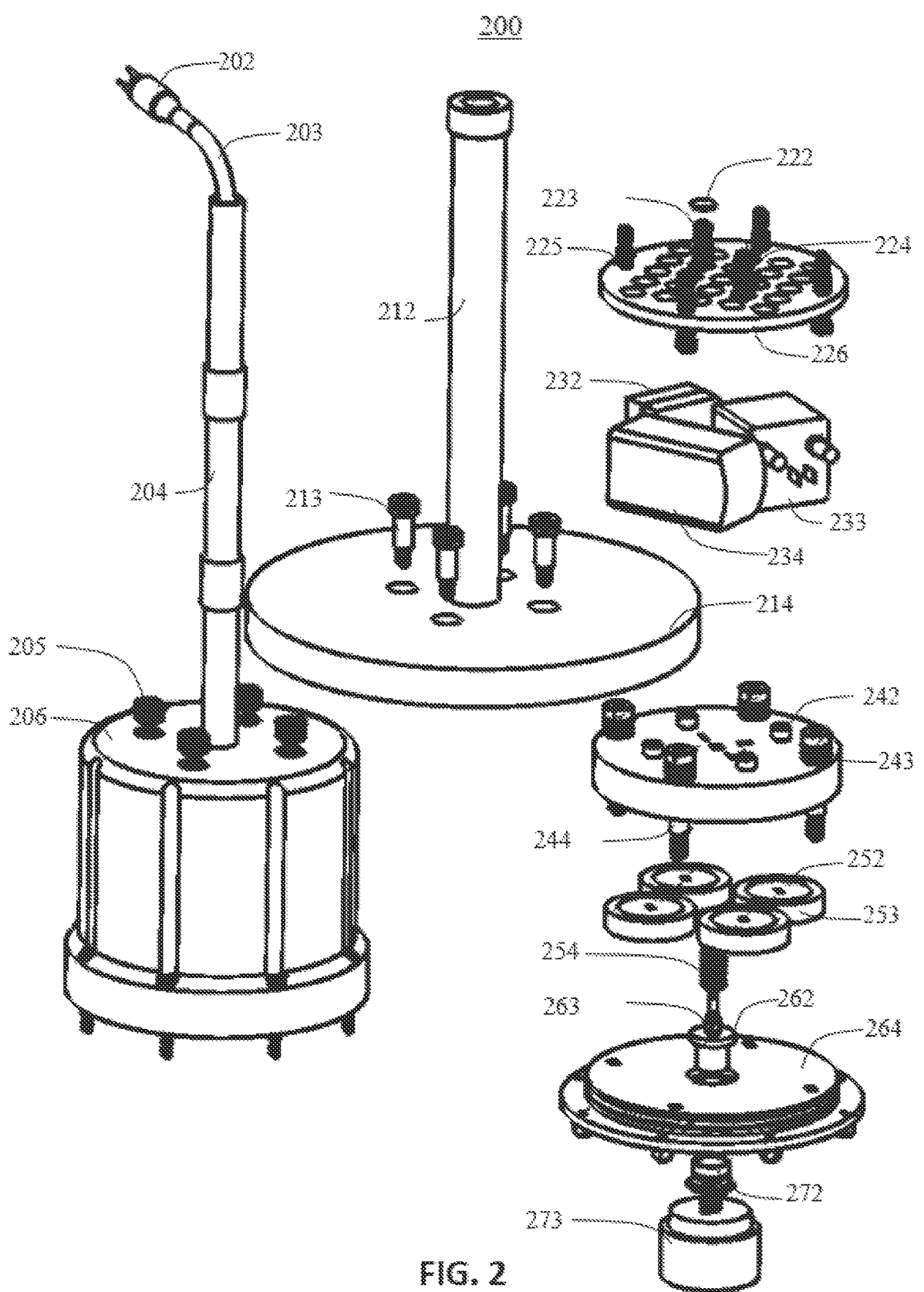
FIG. 2 is a first exploded view of a submersible impact test hammer according to an example embodiment.
Figure 3:
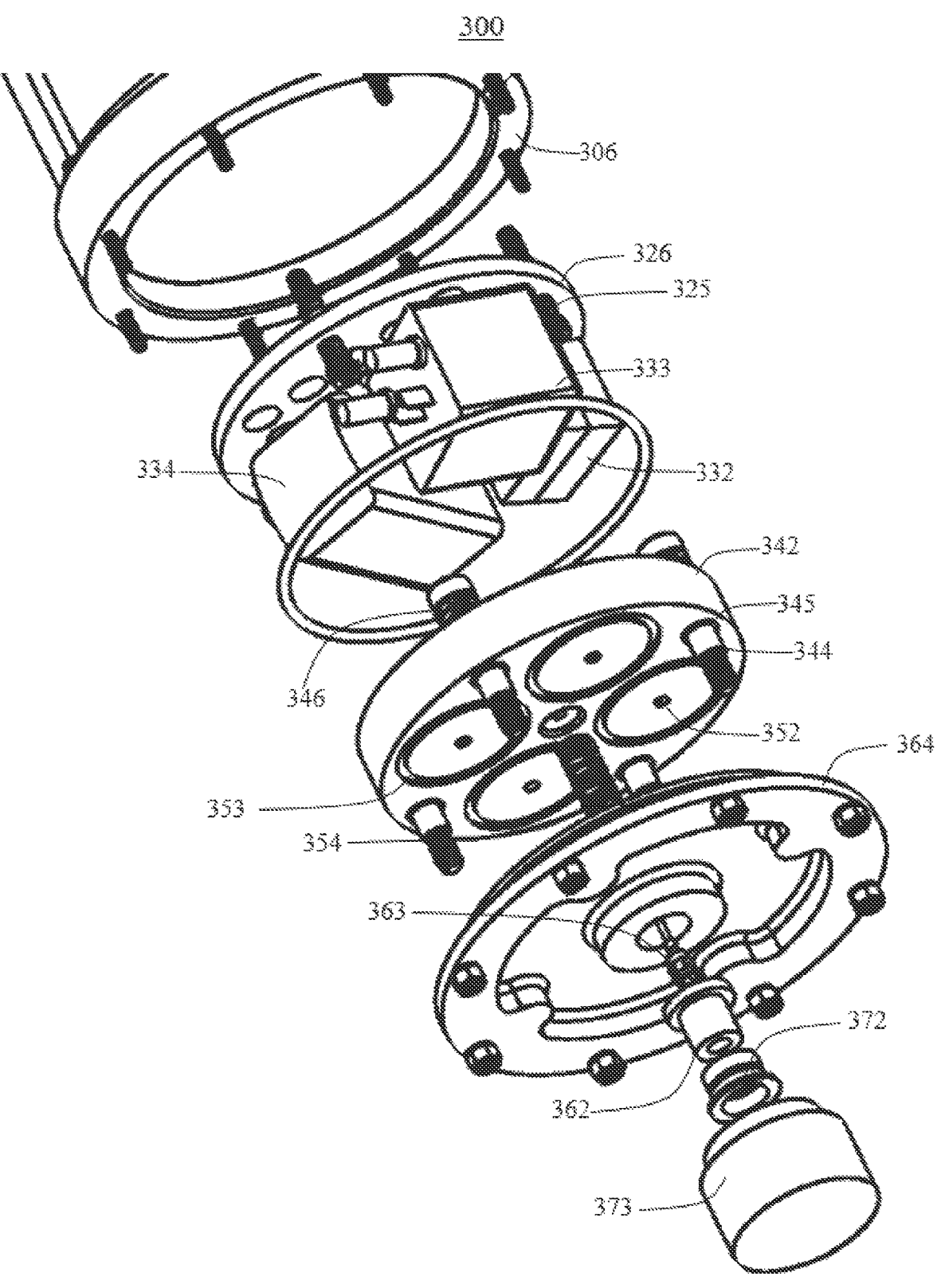
FIG. 3 is a second exploded view of a submersible impact test hammer according to an example embodiment.
Figure 4:
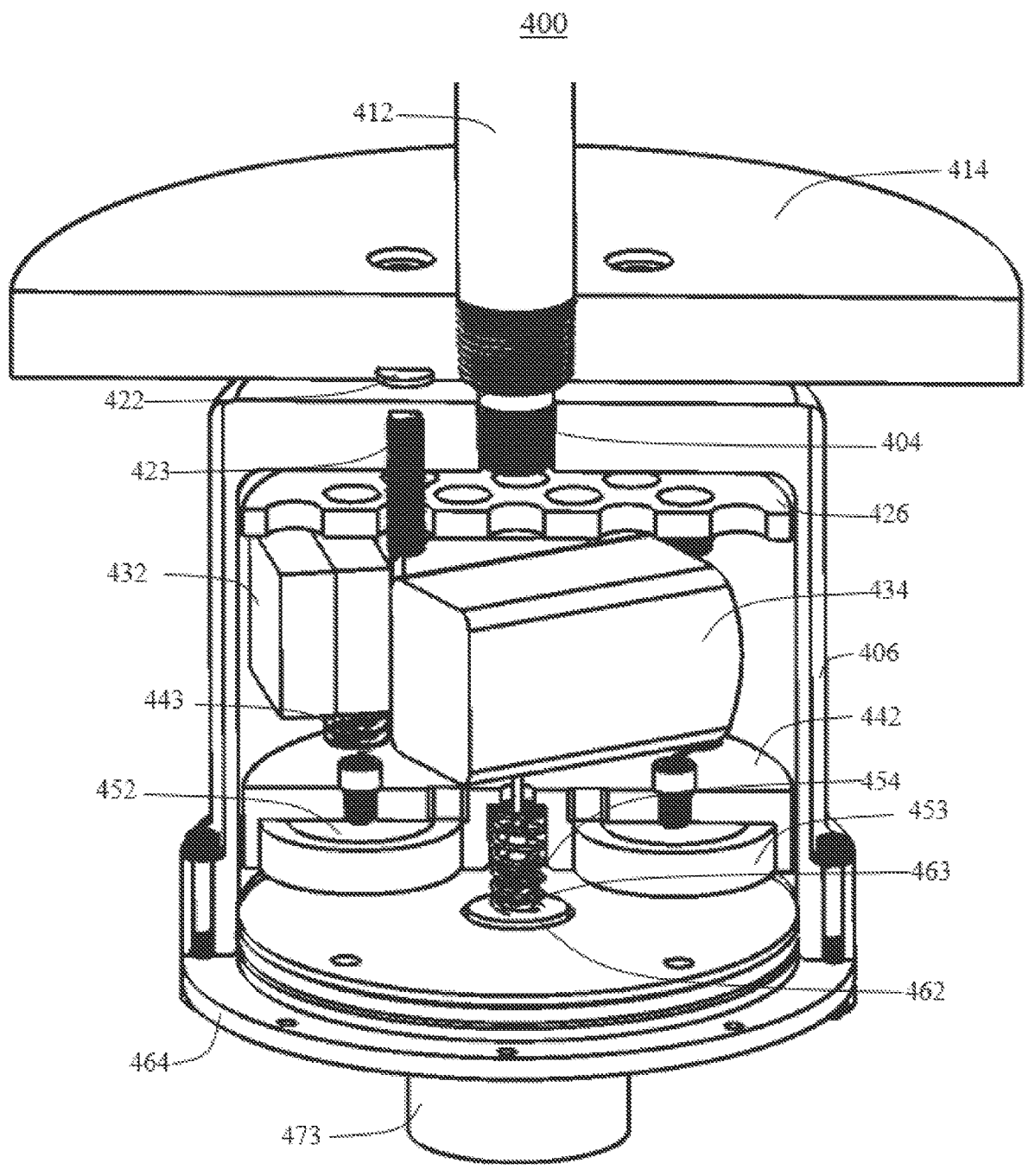
FIG. 4 is a first cutaway view of a submersible impact test hammer according to an example embodiment.
Figure 5:
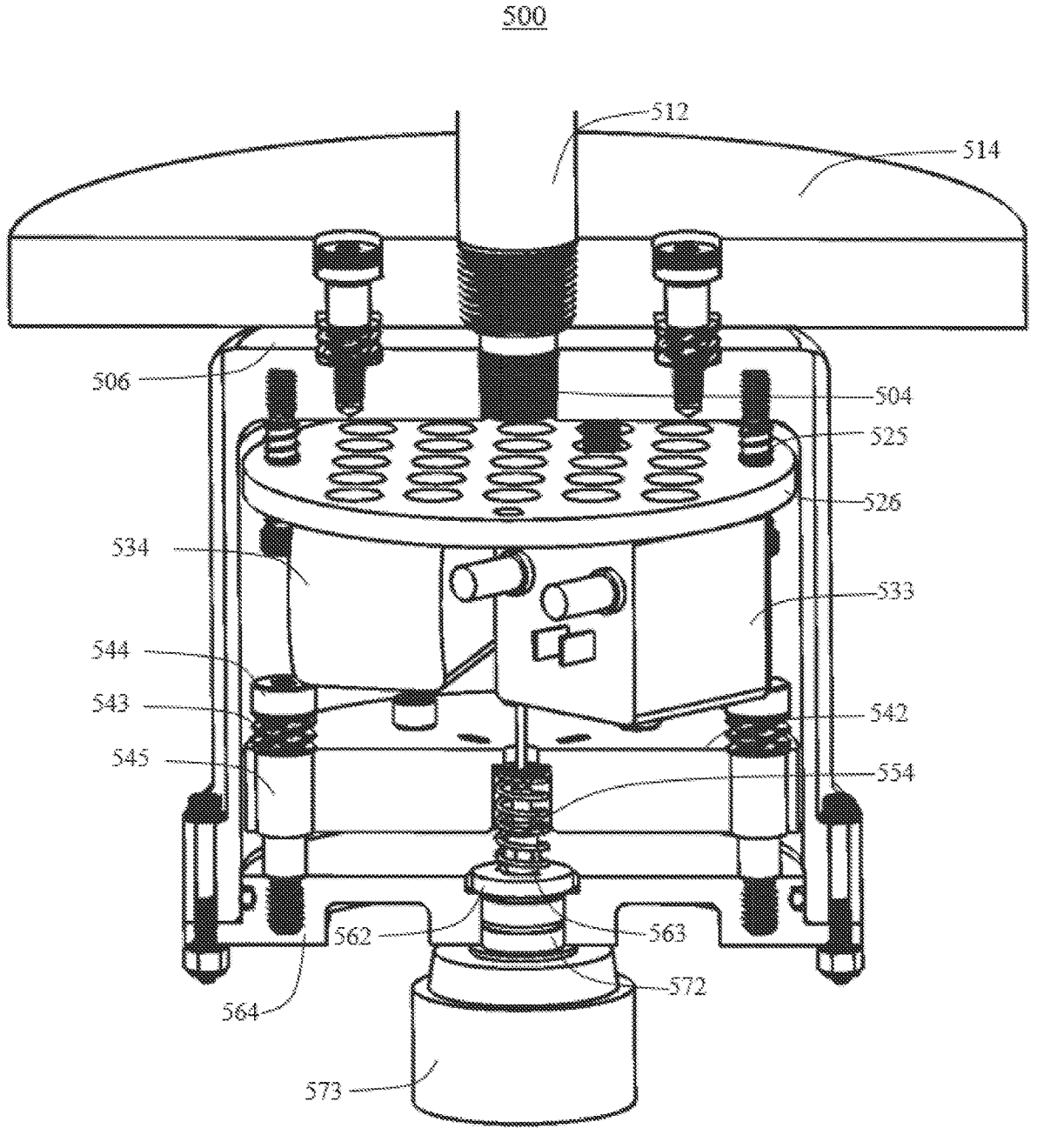
FIG. 5 is a second cutaway view of a submersible impact test hammer according to an example embodiment.

FIG. 2 and FIG. 3 are exploded views of a submersible impact test hammer according to example embodiments. FIG. 4 and FIG. 5 are cutaway views at two angles of a submersible impact test hammer according to example embodiments. FIG. 2, FIG. 3, FIG. 4, and FIG. 5 may be directed to the same example embodiment.

FIG. 2 is a first exploded view of a submersible impact test hammer (200) according to an example embodiment. Outer handle (212) is slidably mounted on inner handle (204) and is connected to baffle (214) which is slidably supported by baffle shaft bolts (213). Trigger springs (205) may be in between and in contact with baffle (214) and pressure housing (206). When an operator presses on outer handle (212), the outer handle (212) may slide along inner handle (204), thereby compressing trigger springs (205) and applying force to pressure housing (206). Outer handle (212) and inner handle (204) may be preferably made from high modulus corrosion resistant material such as stainless steel, titanium, or anodized aluminum. Trigger springs (205) and baffle shaft bolts (213) may be preferably made from stainless steel. Pressure housing (206) and baffle (214) may be preferably made from a plastic such as Polyvinyl Chloride (PVC) or Acrylonitrile Butadiene Styrene (ABS).

A cable connector (203) may protrude from the inner handle (204). At the end of the cable connector may be a cable connected (202).

The pressure housing (206) of the submersible impact test hammer (200) may include various constituent components. A magnetic component includes an embedded magnet (222), a magnetic trigger switch (223), an electrical mount plate (226), and electrical mount springs (225). A relay component includes a battery (234), a time delay relay (232), and a power relay (233). A slug component includes a slug (242), bumper springs (243), and slug shaft bolts (244). A coil component includes four coil centers (252), solenoid coils (253), and a return spring (254). An accelerometer component includes an accelerometer (263), an output shaft (262), and an end closure (264).

The submersible impact test hammer (200) may include a sealing bearing (272) between the end closure (264) and an impact tip (273). This configuration is discussed further below.

FIG. 3 is a second exploded view of a submersible impact test hammer (300) according to an example embodiment. This illustration depicts each component previously discussed, but closer to a final arrangement within a pressure housing (306) of the submersible impact test hammer (300). Closest to the base of the pressure housing (306) is the magnetic component. This view depicts the electrical mount plate (326) and the electrical mount springs (325).

Stacked over the magnetic component is the relay component. As depicted from this view, the relay component includes the battery (334), the time delay relay (332), and the power relay (333). Stacked over the relay component is the slug component. As depicted, the slug component includes the slug (342) and the slug shaft bolts (344). Notably, this view also depicts linear bearings (345). The coil component is embedded with the slug component. As depicted, the coil component includes the four coil centers (352), solenoid coils (353), and return spring (354). Notably, the solenoid coils (353) in particular are embedded in the slug (342).

Stacked over the coil component is the accelerometer component. As depicted, the accelerometer component includes the accelerometer (363), the output shaft (362), and the end closure (364). The end closure (364) may enclose everything in the pressure housing (306). Stacked over the end closure (364) are the sealing bearing (372) and the impact tip (373).

FIG. 4 is a first cutaway view of a submersible impact test hammer (400) according to an example embodiment. As shown, the baffle (414) may have the embedded magnet (422). Magnetic trigger switch (423) is adjustably mounted in pressure housing (406). Motion of outer handle (412) may bring the embedded magnet (422) into proximity with magnetic trigger switch (423), closing the electrical contacts in the magnetic trigger switch (423). When the contacts close, voltage from battery (434) may be applied to time delay relay (432), which has a conducting "on state" and a non-conducting "off-state". Time delay relay (432) is normally in the "off-state" and preferably may have an adjustable time delay from when power is applied to when the "on state" occurs, and adjustable time duration for "on state" before it returns to the "off state."

The inner handle (404) is embedded in the base of the pressure housing (406). As such, the inner handle (404) is directly below the outer handle (412) and above the electrical mount plate (426). At the opposite end of the pressure housing (406) is the impact tip (414).

From this view, the slug component is depicted with the slug (442) and bumper springs (443). The coil component is depicted with the four coil centers (452), solenoid coils (453), and return spring (454). The accelerometer component is depicted with an accelerometer (463), an output shaft (462), and an end closure (464).

The four solenoid coils (453) surround the four coil centers (452) and are embedded in the slug (442). When the contacts of a power relay (such as power relay (233) in FIG. 2) close, voltage from battery (434) may be applied to solenoid coils (453) causing electrical current to flow through the solenoid coils (453) creating an attractive magnetic force between slug (442) and end closure (464). End closure (464) may preferably be made of corrosion resistant magnetic stainless steel. The slug (442) and coil centers (452) may preferably be made of steel or magnetic stainless steel. The solenoid coils (453) may preferably be made of enamel insulated wire (e.g., magnet wire). The solenoid coils (453) may be connected in series or parallel as desired to match the voltage and current output characteristics of battery (434). A number different than four solenoid coils (453) may be used (e.g., one, three, or six).

FIG. 5 is a second cutaway view of a submersible impact test hammer (500) according to an example embodiment. Like the preceding illustration, FIG. 5 shows the various components as hosed in the pressure housing (506). Above the pressure housing (506) is the outer handle (512) and baffle (514). The inner handle (504) is in the center of the base of the pressure housing (506).

As previously stated, the time delay relay (532) is normally in the "off-state" and preferably may have an adjustable time delay from when power is applied to when "on state" occurs, and adjustable time duration for "on state" before it returns to "off state." For example, according to one embodiment, the time delay may be set for approximately three seconds and "on state" duration set for approximately 20 msec. After the set time delay, a time delay relay (such as the time delay relay (232) in FIG. 2) may apply voltage from battery (534) to power relay (533) for the "on state" duration making power relay (533) contacts close for this time and open at the end of this time. Power relay (533) may preferably be a mechanical relay, such as an automotive starter relay, designed for high amperage with contacts closed, and with zero current flow with contacts open to prevent trickle discharge of battery (534). Battery (534) may preferably be a high current discharge battery such as lithium-ion polymer (LiPo). These may include LiPo batteries with 100 Amp output at 22 Volts and energy storage for approximately 500 force pulses.

Slug (542) may be slidably mounted to slug shaft bolts (544) by linear bearings (545). Slug shaft bolts (544) are supported by end closure (564) and are perpendicular to its interior surface. Thus, slug (542) is constrained to move parallel to end closure (564). When current through solenoid coils (such as solenoid coils (253) in FIG. 2) creates an attractive magnetic force between the slug (542) and end closure (564), slug (542) accelerates towards end closure (564) compressing return spring (554). Slug (542) may impact output shaft (562), which is slidably supported by sealing bearing (572) and which is attached to impact tip (573). The resulting force pulse may be transferred through output shaft (562) and impact tip (573) to the test object (not shown).

Accelerometer (563) may be mounted to output shaft (562). Accelerometer (563) may produce an output proportional to the acceleration of output shaft (562), which is the same as the acceleration of slug (542) during the time of impact when the slug (542) and output shaft (562) are in contact. The force transferred from the impact tip (573) to the test object is approximately equal to the mass of slug (542) times the acceleration of output shaft (562). Thus the output of accelerometer (563) may be used as a measure of the force that the submersible impact test hammer applies to the test object. A pre-test calibration against an instrumented test mass is preferred to increase the accuracy of the force measurement.

The on duration of the time delay relay (such as the time delay relay (232) in FIG. 2) may preferably be set such that it turns off at approximately the time of impact between slug (542) and output shaft (562). When time delay relay turns off, the contacts of power relay (533) open, stopping the current flow through solenoid coils (such as solenoid coils (253) in FIG. 2) ending the attractive magnetic force. Return spring (554) then pushes slug (542) away from output shaft (562) back to its original position. Bumper springs (543) reduce the return impact force which would affect the force measurement.

It should be noted that electrical elements, including the time delay relay, power relay (533), and battery (534) are mounted to electrical mount plate (526). The electrical mount plate (526) may be resiliently supported by electrical mount springs (525). Electrical mount springs (525) may resiliently isolate the electrical components from shock produced by the force pulse.

It should be noted that the attractive magnetic force between slug (542) and end closure (564) that causes acceleration of slug (542) may also cause a reaction force on the remainder of the submersible impact test hammer in the opposite direction. This force may be undesirable as it could be transmitted to the operator and because it may cause the impact tip (573) to come out of contact with the test object. The reaction force is resisted by the remaining mass of the submersible impact test hammer and by the virtual mass of entrained fluid. Baffle (514) may add virtual mass to reduce undesirable reaction motion. Baffle (514) may preferably be a flat plate of low mass but the size and shape may be optimized for a particular design. The virtual mass may be adequate to prevent reaction motion from affecting the operator and the impact tip (573) from coming out of contact with the test object. The virtual mass for one side of a flat plate may be estimated as $8/3*$fluid density$*$radius$^3$. For example, a two-sided flat plate of 0.3 m provides a virtual mass of approximately 18 kg which is adequate for most practical submersible impact test hammer embodiments.

Figure 6:
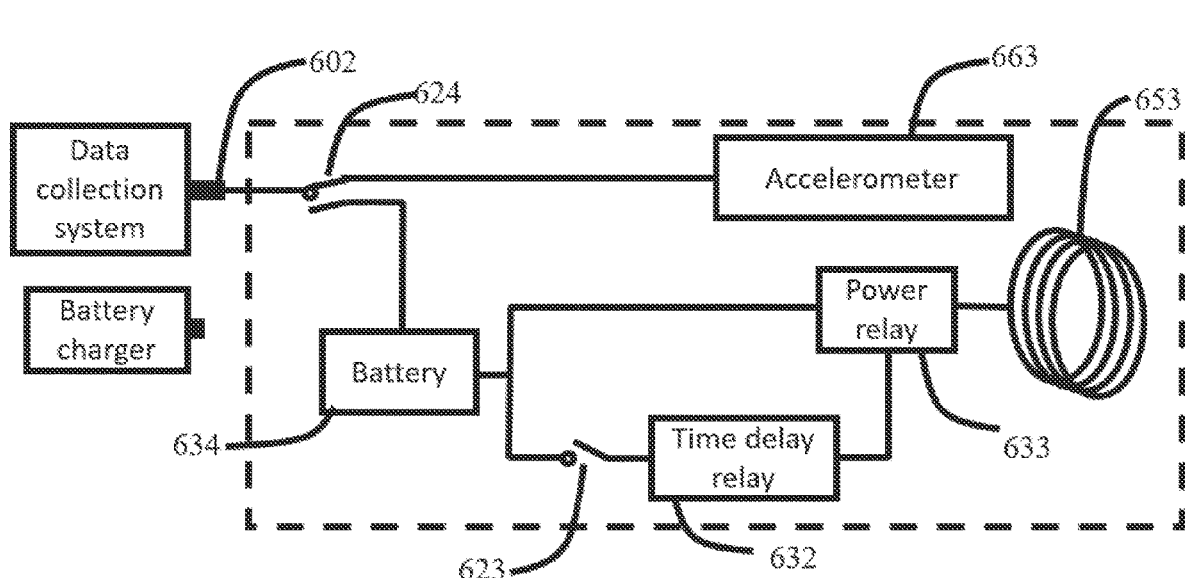
FIG. 6 is a simplified circuit diagram illustrating the wiring connections of the electrical components of a submersible impact test hammer according to an example embodiment.

FIG. 6 is a simplified circuit diagram (600) illustrating the wiring connections of electrical components of a submersible impact test hammer according to an example embodiment. Here it can be seen that during operation, cable connector (602) may be connected to an external data collection system. Accelerometer (663) may receive power from, and provides force measurement to, the data collection system through the cable connector (602). However, cable connector (602) may be disconnected from the external data collection system and connected to an external battery charger system which is also not part of the invention. Then, magnetic charge switch (624) may be toggled by an external magnet (not shown) to disconnect accelerometer (663) from the cable connector (602) and connect to battery (634) instead, resulting in battery (634) being charged. Also depicted is an example configuration of the battery (634) connection to the power relay (633) and the time delay relay (632). The magnetic trigger switch (623) may be between the battery (634) and the time delay relay (632). The power relay (633) may be connected to the four solenoid coils (653).

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. A submersible impact test hammer, comprising:

a resilient tip;

an output shaft connected to the resilient tip such that it transmits a force to the resilient tip;

an end closure;

a pressure housing attached to the end closure such that the two enclose a watertight volume;

a sealing bearing that supports the output shaft to the end closure and allows relative movement while preventing leakage into the watertight volume;

a slug;

solenoid coils;

slug shaft bolts supported by the end closure and perpendicular to its interior surface;

linear bearings that slidably mount the slug to the slug shaft bolts; and a spring between the slug and the output shaft;

wherein current through the solenoid coils creates an attractive magnetic force between the slug and the end closure accelerating the slug toward the end closure, and wherein impact of the slug against the output shaft creates a force pulse which is transmitted to the resilient tip and then to a test object.

2. The submersible impact test hammer of claim 1, further comprising:

a battery;

a time delay relay with settable time delay from power applied to on state and settable time duration for on state;

a power relay;

a magnetic switch; and a magnet;

wherein moving the magnet into proximity with the magnetic switch closes the magnetic switch contacts applying voltage from the battery to the time delay relay, wherein the time delay relay, after its set time delay, applies battery voltage to the power relay for the set time duration, and wherein the power relay contacts close for the set time duration applying battery voltage to the solenoid coils causing current to flow through the solenoid coils.

3. The submersible impact test hammer of claim 2, further comprising:

an accelerometer mounted to the output shaft, wherein the accelerometer measures the acceleration of the output shaft during the impact, facilitating extrapolation of a magnitude of the force transmitted to the impact tip.

4. The submersible impact test hammer of claim 3, further comprising:

a external cable configured to be connected at a first end to one of the accelerometer and the battery;

a cable connector at a second end of the external cable; and a magnetic charge switch;

wherein the cable connector is configured to be connected to an external data collection system during operation, and wherein the cable connector is configured to be connected to an external battery charging system; and wherein the magnetic charge switch may be toggled with an external magnet to alter a the external cable configuration at the first end between the accelerometer and the battery, such that in a first configuration the first end is connected to the accelerometer, and in a second configuration the first end is connected to the battery;

wherein in the second configuration, the battery is charged when the cable connector is connected to the external battery charging system.

5. The submersible impact test hammer of claim 2, further comprising:

an electrical mount plate; and electrical mount springs resiliently supporting the electrical mount plate;

wherein the time delay relay, power relay, and the battery are mounted to the electrical mount plate and resiliently isolated from shock produced by the force pulse.

6. The submersible impact test hammer of claim 1, further comprising:

an inner handle;

an outer handle slidably mounted on the inner handle;

a baffle mounted to the outer handle; and trigger springs between the baffle and the pressure housing;

wherein pressing the resilient tip against the test object causes the outer handle to slide on the inner handle, compressing the trigger springs, and wherein the baffle adds virtual mass from entrained fluid to reduce reaction motion.

* * * * *